United States Patent [19]

Brooks et al.

[11] 4,334,891

[45] Jun. 15, 1982

[54] MODIFICATION OF LIQUID HYDROCARBONS

[75] Inventors: Herbert Brooks, Twyford; Frederick A. Waite, Farnham Common, both of England

[73] Assignee: Imperial Chemical Industries Limited, London, England

[21] Appl. No.: 270,813

[22] Filed: Jun. 5, 1981

Related U.S. Application Data

[63] Continuation of Ser. No. 146,411, May 5, 1980, Pat. No. 4,292,045.

[30] Foreign Application Priority Data

May 10, 1979 [GB] United Kingdom ............... 7916311

[51] Int. Cl.³ .................................................. C10L 1/22
[52] U.S. Cl. ...................................................... 44/62
[58] Field of Search ............................ 44/62; 526/317

[56] References Cited

U.S. PATENT DOCUMENTS 3,803,034  4/1974  Gaydasch ............................. 44/62
3,812,034  4/1974  Gaydasch ............................. 44/62

FOREIGN PATENT DOCUMENTS 1384536  2/1975  United Kingdom .

*Primary Examiner*—Winston A. Douglas
*Assistant Examiner*—Y. Harris-Smith
*Attorney, Agent, or Firm*—Cushman, Darby & Cushman

[57] ABSTRACT

Specified copolymers of tert-butylstyrene are dissolved in a liquid aliphatic hydrocarbon fuel, especially an aircraft fuel, by the steps of (i) blending the finely-divided copolymer with a non-solvent hydroxylic liquid miscible with the fuel, (ii) mixing the blend into the fuel so as to give a copolymer concentration of 01.–1% by weight, and (iii) dissolving in the fuel so treated an amino compound in an amount of 0.01–0.6 mole per 100 g of copolymer present. The copolymers thus dissolved impart to the fuel a resistance towards mist formation when the fuel is subjected to conditions of shock.

9 Claims, No Drawings

MODIFICATION OF LIQUID HYDROCARBONS

This application is a continuation of Ser. No. 146,411 filed May 5, 1980, which is now U.S. Pat. No. 4,292,045.

This invention relates to the modification of liquid hydrocarbon aircraft fuels, with the object of reducing the tendency of the fuels to form mists when subjected to conditions of shock, by dissolving in them a specified type of polymer. More particularly, it relates to a method whereby such a polymer may be dissolved in a liquid hydrocarbon fuel by a simple, rapid mixing procedure.

In our British Patent Specification No. 1,384,536 we have described a method of dissolving a polymer in a liquid hydrocarbon fuel having a flash point not less than 90° F., characterized in that a dispersion of the polymer in an organic liquid in which the polymer is insoluble but with which the fuel is miscible is admixed with the liquid hydrocarbon fuel. Suitable liquids in which the polymer may be dispersed, according to that Specification, include polar liquids such as alcohols and glycols where the liquid fuel is an aliphatic hydrocarbon. The purpose of dissolving the polymer in the liquid fuel is that of reducing the tendency of the fuel to form a readily ignitable mist under shock conditions such as those encountered in an aircraft crash. There are, however, substantial practical problems in dissolving the requisite proportion of polymer (say 0.1–1.0% by weight) in the large quantities of fuel which are handled and consumed in everyday aircraft operation. For the reasons explained in the above-mentioned Specification, it is impracticable to mix polymer and fuel at any stage prior to the actual loading of the fuel into the aircraft, but, if the polymer is to be introduced into the fuel in the course of that operation, it is necessary to achieve rapid dissolution of the polymer in view of the high flow rate at which refuelling is normally carried out. The method of British Specification No. 1,384,536 provides an answer to these problems which is applicable in many cases, the pre-mixing of the polymer with the polar liquid affording a significant enhancement of the rate of dissolution of the polymer in the fuel.

We find, however, that, when we apply the method of British Specification No. 1,384,536 to the dissolution of certain polymers in, say, aviation kerosene, using a hydroxylic liquid as the dispersion liquid, the dissolution of the polymer is acceptably rapid but the anti-misting properties of the treated fuel thus obtained are inferior to those of the same fuel in which the same copolymer has been dissolved by the more time-consuming method of stirring the polymer into the fuel in the absence of any hydroxylic liquid. Polymers which behave in this way include the copolymers of tert-butylstyrene which are described and defined in our British Patent Application No. 7,909,483.

We have now found that, in the foregoing circumstances, the anti-misting properties of the fuel treated according to Specification No. 1,384,536 can be restored substantially to the same level as, or even a higher level than, that attained when the hydroxylic carrier liquid is omitted, by dissolving an amine compound in the fuel so treated.

Thus according to the present invention we provide a method for dissolving, in a liquid aliphatic hydrocarbon fuel having a flash point not less than 90° F., a copolymer of (i) at least 75% by weight of tert-butylstyrene, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyltoluene, and (iii) from 1% to 10% by weight of methacrylic acid, the aggregate of monomers (i), (ii) and (iii) being 100% and the copolymer having the following characteristics:

(a) it is soluble in AVTUR 50 aviation kerosene;
(b) a 0.3% by weight solution of the copolymer in AVTUR 50 aviation kerosene has a relative viscosity in the range 1.3 to 2.6 and a differential orifice flow rate in the range 3 to 7 ccs. per 30 seconds.

the terms "soluble", "AVTUR 50", "relative viscosity" and "differential orifice flow rate" having the respective meanings hereinafter defined, the method consisting in the steps of (A) blending the copolymer in finely divided form with a hydroxylic liquid which is a non-solvent for the polymer or at most a weak swellant therefor but which is miscible to the extent of at least 1% by weight with the fuel; (B) mixing the blend of the copolymer and the hydroxylic liquid into the fuel so as to give a concentration of copolymer in the fuel of from 0.1% to 1% by weight; and (C) dissolving in the fuel so treated from 0.01 to 0.6 mole, based on each 100 g of copolymer present, of an amino compound.

By "soluble in AVTUR 50" we mean that solutions of the copolymer in AVTUR 50, at all concentrations in the range 0.1% to 1% by weight, are, notwithstanding that they may appear hazy or opalescent, nevertheless homogeneous in the sense that no gross separation from them of a swollen polymer phase occurs on standing for 24 hours at 20° C.

By "AVTUR 50" we mean a liquid hydrocarbon fuel complying with U.K. Government Specification D.Eng.RD 2494 (NATO Code No. F-35) and having a flash point not lower than 100° F. AVTUR 50 normally has a viscosity of 1.0–1.5 cp at 25° C.

By "relative viscosity" we mean the ratio of (i) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (ii) the viscosity of AVTUR 50 when measured under those same conditions.

By "differential orifice flow rate" we mean the difference between (a) the flow rate of a 0.3% by weight solution of the copolymer in AVTUR 50 through a passage of circular cross-section having a square-edged orifice, the passage having a length of 0.062 inches and a diameter of 0.025 inches, and (b) the flow rate through the same said passage of a Newtonian liquid having the same viscosity as that of the copolymer solution referred to in (a) when the said viscosities are measured by the method of British Standard No. 188:1937, the flow rates being expressed as the volume of liquid in ccs. which passes through the orifice during the second period of 30 seconds of flow. Apparatus suitable for carrying out the differential orifice flow rate determination may be constructed by appropriately modifying a type A cup according to British Standard No. 1733.

The method of the invention is of particular interest in connection with the dissolution of copolymers as hereinabove defined which, when dissolved in AVTUR 50 at a concentration of 0.3% by weight, have a relative viscosity in the range 1.3 to 2.1 and a differential orifice flow rate in the range 3 to 6 ccs. per 30 seconds.

As stated above, the hydroxylic liquid with which the copolymer is blended, prior to its being introduced into the liquid fuel, must be one which does not dissolve the copolymer, or is at most only a weak swellant for the copolymer in the sense that a mixture of the copolymer in the particulate state with the hydroxylic liquid has a paste-like rather than a rubber-like consistency. The hydroxylic liquid must, at the same time, be miscible with the liquid fuel to the extent of at least 1% by weight. Suitable hydroxylic liquids satisfying these requirements include aliphatic monohydric and dihydric alcohols, more particularly methanol, ethanol, propanol and 2-ethoxyethanol amongst the monohydric alcohols and propylene glycol, butylene glycol, 2-methyl-2:4-pentanediol and diethylene glycol amongst the dihydric alcohols. In general, the suitability of a given hydroxylic liquid may be determined by simple experimental tests of its swelling power for the copolymer and its miscibility with the liquid fuel. However, where the liquid fuel is an aviation kerosene such as AVTUR 50, Jet A or a similar fuel, we find that a preferred hydroxylic liquid is 2-methyl-2:4-pentanediol. If desired, a mixture of two or more suitable hydroxylic liquids may be employed instead of a single liquid.

The copolymer in finely divided form may be blended with the hydroxylic liquid in step (A) of the method in any suitable way, for example by hand mixing or by mechanical means, e.g. using a heavy duty blender. Where the proportion of copolymer in the blend is low, i.e. of the order of 15-25% by weight of the total blend, the blend will be of relatively low viscosity, but at significantly higher proportions the blend may have a paste-like consistency. Generally it is preferred to operate at a higher proportion, say in the range 30% to 40% by weight, since under these conditions relatively little settlement of the copolymer occurs if the blend is allowed to stand or is stored for some time prior to its being mixed with the liquid fuel. Suitable finely divided copolymer may conveniently be obtained, in the case where the copolymer is made by a process of aqueous emulsion polymerisation of monomers, by removal of the aqueous phase e.g. by freeze drying or spray drying, but other methods may be employed such as precipitation of the copolymer from solution or comminution of bulk copolymer.

In step (B) of the method, the blend of copolymer and hydroxylic liquid is added to the liquid fuel under conditions of efficient mixing. Preferably an initial period of turbulent mixing into the fuel is followed by a period of more gentle agitation; under these conditions the blend is rapidly dispersed into the fuel and a clear product results. The addition may be carried out either batchwise or continuously; in view, however, of the interest in achieving effective modification of an aircraft fuel during a refuelling operation, continuous addition of the blend is particularly preferred.

In step (C) of the method, there is introduced, into the fuel treated with the copolymer in the preceding steps, an amino compound in an amount of from 0.01 to 0.6 mole based on each 100 g of the copolymer taken. Preferably the amount of amino compound is from 0.02 to 0.2 mole per 100 g of copolymer. Suitable amino compounds include the alkyl monoamines containing from 1 to 12 carbon atoms; these may be primary, secondary or tertiary in character. Examples of suitable members of this class include methylamine, ethylamine, butylamine and triethylamine. Also suitable are alkanolamines containing from 4 to 10 carbon atoms, such as diethanolamine, triethanolamine and tri-propanolamine, aromatic amines such as aniline and the N-alkylanilines where the alkyl group contains from 1 to 4 carbon atoms, and heterocyclic amines such as piperidine and morpholine. The preferred amino compounds are the primary aliphatic amines containing from 3 to 10 carbon atoms, in particular n-butylamine. If desired, a mixture of two or more suitable amino compounds may be used instead of a single amino compound.

The amount of the amino compound must, as already stated, be at least 0.01 mole per 100 g of copolymer taken, in order to ensure that the liquid fuel being treated according to steps (A) and (B) develops a satisfactory degree of resistance to misting under shock conditions. In the presence of any smaller proportion than this of the amino compound, or in its complete absence, admixture of the copolymer-hydroxylic liquid blend with the fuel results in dissolution of the copolymer but the anti-misting properties of the solution are relatively slight. The optimum amount of amino compound will normally lie significantly above this lower limit, but below the upper limit previously stated of 0.6 mole per 100 g of copolymer.

There are two alternative ways in which the amino compound may be introduced. On the one hand, it may be added in step (C) as a separate operation subsequent to completion of step (B); on the other hand, it may be added to the liquid fuel simultaneously with the blend of the copolymer and the hydroxylic liquid, in other words, by carrying out steps (B) and (C) together. From a procedural point of view, the second of these alternatives is to be preferred since it enables a quantity of aircraft fuel to be modified in a single operation, i.e. by a "one-shot" addition of the three active materials. Under these circumstances, however, the optimum amount of amino compound will usually represent a compromise, inasmuch as an increase in the amount of the amino compound, whilst it enhances the anti-misting properties of the treated fuel, tends to slow down the rate of dissolution of the copolymer in the fuel. In practice it is a matter of simple experimental trial to select the optimum proportions of copolymer, hydroxylic liquid and amino compound in any given case. Employing the proportions thus established, a "one-shot" treatment of liquid fuel and the development therein of satisfactory anti-misting properties can usually be effected within a time interval of 15 minutes, which is compatible with most aircraft refuelling schedules.

In cases, however, where it is desired to use amounts of amino compound in the upper part of the range previously stated, say in the region of 0.4-0.6 mole per 100 g of copolymer, or where complete freedom of choice of the amounts of copolymer and amino compound respectively is required, and yet at the same time the speed of dissolution of the copolymer is important, it is desirable to operate steps (B) and (C) sequentially, so that the copolymer is rapidly and fully dissolved before the amino compound is introduced.

It is assumed, in the foregoing discussion, that the solubility of the amino compound in the liquid fuel is at least sufficient to enable the stated proportions to be attained of amino compound actually dissolved therein.

The invention is illustrated by the following Examples, in which parts, percentages and ratios are by weight:

EXAMPLE 1

An aqueous copolymer dispersion is prepared by polymerising a mixture of tert-butylstyrene, methyl methacrylate and methacrylic acid in the ratios 83:10:7 in the manner described in Example 1 of British Application No. 7,909,483, as follows.

To a polymerisation vessel fitted with nitrogen inlet extending below the liquid level there is charged:

| | |
|---|---|
| Distilled water | 1152 parts |
| Acetone | 288 parts |
| Sodium dioctylsulphosuccinate | 9 parts |

This charge is stirred until the surfactant has completely dissolved. There is then added 360 parts of a pre-mixed charge of monomer having the composition tertbutylstyrene 83%, methyl methacrylate 10% and methacrylic acid 7%. The temperature of the reaction mixture is adjusted to 25° C. and a nitrogen sparge is started at the rate of 200 ml of nitrogen per minute per Kg of total charge. After nitrogen has been passed for 5 minutes, there are added in the order stated the following initiator charges, prepared immediately prior to addition by dissolving each solid in the water:

| | | |
|---|---|---|
| Ammonium persulphate | 0.18 | part |
| Distilled water | 9 | parts |
| Sodium dithionite | 0.3 | part |
| Distilled water | 9 | parts |

The nitrogen flow rate is then reduced to 50 ml per minute per Kg of total charge, and the temperature is maintained within the range 25°–30° C. for a total period of 6 hours counted from the addition of the initiators, cooling as necessary in order to control the reaction exotherm. Finally there is added 18 parts of a 0.1% solution of n-octyl mercaptan and stirring and nitrogen flow are then discontinued.

There is thus obtained an aqueous copolymer emulsion of solids content approximately 20% by weight and average particle diameter 0.05–0.1 micron, having a relative viscosity of 1.70 and a differential orifice flow rate of 4.25 ccs per 30 seconds. This polymer emulsion is then spray dried. 34 parts of the resulting powder are blended with a mixture of 64.3 parts of 2-methyl pentane-2:4-diol and 1.7 parts of n-butylamine in a mixer suitable for handling viscous pastes. The resulting blend has paste properties similar to those of toothpaste.

The following procedure illustrates the rapid dissolution of the polymeric additive in aviation fuel.

1 part of the above blend is injected into 110 parts of AVTUR 50 which is rapidly stirred during the addition. When the addition is complete, the stirring rate is reduced and the composition is gently agitated for 15 minutes. The resulting solution has a relative viscosity of 1.66 and its differential orifice flow rate is 4.0. The concentration of copolymer in the solution is 0.3% and it contains 0.068 mole of n-butylamine per 100 g of copolymer.

EXAMPLE 2

(A) The blending and dissolution procedure of Example 1 is repeated but with the omission of the n-butylamine. The resulting solution has a relative viscosity of 2.0 and a differential orifice flow rate of 1.1.

(B) The procedure of Example 2(A) is repeated, with the addition to the 110 parts of solution (after the copolymer-diol blend has completely dissolved) of 0.017 part of n-butylamine. The solution thus obtained has a relative viscosity of 1.72 and a differential orifice flow rate of 4.6.

EXAMPLE 3

The fuel solutions described in Example 1 and Example 2(B) are both diluted with further AVTUR 50 to a concentration of 0.1% of the copolymer, and are then subjected to the test of resistance to misting and ignition which is described in Example 1 of Specification No. 1,384,536. No substantial ignition of the fuel is observed.

EXAMPLE 4

30 parts of spray-dried copolymer, prepared as described in Example 1, is hand-stirred into a blend of 63 parts of 2-methyl pentane-2:4-diol and 7 parts of morpholine to form a slurry.

1 part of the slurry is added to 99 parts of AVTUR 50, and the mixture immediately subjected to vigorous shaking for 30 seconds. On allowing to stand at rest for 20 minutes, the kerosene gradually loses turbidity and forms a substantially clear solution containing 0.3% of the copolymer.

The sample is further diluted with AVTUR 50 to a copolymer concentration of 0.1% and subjected to the fire-test as described in Example 1 of Specification No. 1,384,536. There is no ignition of the ejected fuel.

EXAMPLE 5

The procedure of Example 4 is repeated, but replacing the morpholine by an equal amount of n-propylamine. A similar result is obtained to that described in Example 4.

EXAMPLE 6

A dispersion consisting of 34 parts of spray-dried copolymer obtained as described in Example 1, 64.3 parts of 2-methyl pentane-2:4-diol and 1.7 parts of n-butylamine is replaced by compounding in a twin Sigma-bladed mixer.

A sample of the dispersion is metered into a turbulent flow of Jet A fuel, in the proportion of 0.9 part dispersion:99.1 part fuel, and transferred to a 10-gallon capacity tank, fitted to a rocket-propelled sled. Fifteen minutes after introducing the copolymer dispersion into the fuel, the sled is fired along a track into arrester gear at 88 meters per second, and the fuel is ejected through an array of ignition sources. No ignition of the fuel occurs. A similar procedure, but using unmodified Jet A fuel, results in a large fire-ball.

EXAMPLE 7

A dispersion consisting of 30 parts of spray-dried copolymer obtained as described in Example 1, 67.44 parts of 2-methyl pentane-2:4-diol and 2.56 parts of 2-ethyl-1-amino hexane is prepared as described in Example 6.

A sample of the dispersion is metered into a turbulent flow of Jet A-1 fuel in the ratio 1 part copolymer dispersion: 99 parts fuel and subjected to the fire-test procedure described in Example 6. There is no ignition of the ejected fuel.

We claim:

1. A composition suitable for addition to a liquid aliphatic hydrocarbon fuel in order to impart to the fuel a resistance towards mist formation when the fuel is subject to conditions of shock, the composition comprising (A) a copolymer of a mixture of monomers consisting of (i) at least 75% by weight of tert-butylstyrene as one monomer, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyltoluene, and (iii) from 1% to 10% by weight of methacrylic acid as a third monomer, the aggregate of monomers (i), (ii) and (iii) being 100% and the copolymer having the following characteristics:
   (a) it is soluble in AVTUR 50 aviation kerosene;
   (b) a 0.3% by weight solution of the copolymer in AVTUR 50 aviation kerosene has a relative viscosity in the range 1.3 to 2.6 and a differential orifice flow rate in the range 3 to 7 ccs per 30 seconds, and (B) a hydroxylic liquid which is a non-solvent for the copolymer or only a weak swellant therefor but which is miscible to the extent of at least 1% by weight with the fuel.

2. A composition suitable for addition to a liquid aliphatic hydrocarbon fuel in order to impart to the fuel a resistance towards mist formation when the fuel is subjected to conditions of shock, the composition comprising (A) a copolymer of a mixture of monomers consisting of (i) at least 75% by weight of tert-butylstyrene as one monomer, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyltoluene, and (iii) from 1% to 10% by weight of methacrylic acid as a third monomer, the aggregate of monomers (i), (ii) and (iii) being 100% and the copolymer having the following characteristics:
   (a) it is soluble in AVTUR 50 aviation kerosene;
   (b) a 0.3% by weight solution of the copolymer in AVTUR 50 aviation kerosene has a relative viscosity in the range 1.3 to 2.6 and a differential orifice flow rate in the range 3 to 7 ccs per 30 seconds,
(B) a hydroxylic liquid which is a non-solvent for the copolymer or only a weak swellant therefor but which is miscible to the extent of at least 1% by weight with the fuel, and (C) from 0.01 to 0.6 mole, based on each 100 g of copolymer, of an amino compound selected from the group consisting of alkyl monoamines containing from 1 to 12 carbon atoms, alkanolamines containing from 4 to 10 carbon atoms, aromatic amines and heterocyclic amines.

3. A composition as claimed in claim 1 or claim 2, wherein the hydroxylic liquid is 2-methyl-2:4-pentanediol.

4. A composition as claimed in claim 1 or claim 2, wherein the copolymer constitutes from 30% to 40% by weight of the total composition.

5. A composition as claimed in claim 2, wherein the amount of the amino compound is from 0.02 to 0.2 mole per 100 g of copolymer.

6. A composition as claimed in claim 2, wherein the amino compound is a primary aliphatic amine containing from 3 to 10 carbon atoms.

7. A composition as claimed in claim 6, wherein the amine compound is n-butylamine.

8. A fuel composition of improved resistance towards mist formation comprising (1) a liquid aliphatic hydrocarbon fuel which is normally subject to mist formation when the fuel is subjected to conditions of shock and (2) an effective amount of a modifier which reduces said tendency to mist formation, said modifier being a composition comprising (A) a copolymer of a mixture of monomers consisting of (i) at least 75% by weight of tert-butylstyrene as one monomer, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyltoluene, and (iii) from 1% to 10% by weight of methacrylic acid as a third monomer, the aggregate of monomers (i), (ii) and (iii) being 100% and the copolymer having the following characteristics:
   (a) it is soluble in AVTUR 50 aviation kerosene;
   (b) a 0.3% by weight solution of the copolymer in AVTUR 50 aviation kerosene has a relative viscosity in the range 1.3 to 2.6 and a differential orifice flow rate in the range 3 to 7 ccs per 30 seconds,
(B) a hydroxylic liquid which is a non-solvent for the copolymer or only a weak swellant therefor but which is miscible to the extent of at least 1% by weight with the fuel, and (C) from 0.01 to 0.6 mole, based on each 100 g of copolymer, of an amino compound selected from the group consisting of alkyl monoamines containing from 1 to 12 carbon atoms, alkanolamines containing from 4 to 10 carbon atoms, aromatic amines and heterocyclic amines.

9. A fuel composition as claimed in claim 8, wherein the hydroxylic liquid is 2-methyl-2:4-pentanediol and the amino compound is n-butylamine.

* * * * *